(12) United States Patent
Zhang

(10) Patent No.: US 10,292,023 B2
(45) Date of Patent: May 14, 2019

(54) SERVICE DATA TRANSMISSION METHOD, TERMINAL AND CHARGING SYSTEM, COMPUTER STORAGE MEDIUM

(71) Applicant: ZTE Corporation, Shenzhen (CN)

(72) Inventor: Yabing Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/569,632

(22) PCT Filed: Aug. 12, 2015

(86) PCT No.: PCT/CN2015/086806
§ 371 (c)(1),
(2) Date: Oct. 26, 2017

(87) PCT Pub. No.: WO2016/173146
PCT Pub. Date: Nov. 3, 2016

(65) Prior Publication Data
US 2018/0288584 A1      Oct. 4, 2018

(30) Foreign Application Priority Data
Apr. 27, 2015   (CN) .......................... 2015 1 0205973

(51) Int. Cl.
*H04M 11/00*     (2006.01)
*H04W 4/24*      (2018.01)
(Continued)

(52) U.S. Cl.
CPC ......... *H04W 4/24* (2013.01); *H04M 15/8038* (2013.01); *H04M 15/852* (2013.01);
(Continued)

(58) Field of Classification Search
CPC ....... H04W 4/24; H04W 76/10; H04W 12/06; H04M 15/8038; H04M 15/854
(Continued)

(56) References Cited

U.S. PATENT DOCUMENTS 8,565,689 B1 * 10/2013 Rubin .................. H04B 17/382
455/67.11
9,125,064 B2 * 9/2015 Rubin .................. H04W 16/14
(Continued)

FOREIGN PATENT DOCUMENTS

| CN | 102056135 A | 5/2011 |
| CN | 102917338 A | 2/2013 |

(Continued)

OTHER PUBLICATIONS

International Search Report in international application No. PCT/CN2015/086806, dated Jan. 27, 2016, 2 pgs.
(Continued)

*Primary Examiner* — Marceau Milord
(74) *Attorney, Agent, or Firm* — Cooper Legal Group, LLC

(57) ABSTRACT

Disclosed are a service data transmission method, a terminal and a charging system, and a computer storage medium. The method comprises: when detecting that a terminal roams from a local place to a different place, requesting and acquiring V-SIM card information about the different place from a V-SIM card server; disconnecting network connections which are established using a SIM card, and establishing network connections using the acquired V-SIM card information; and transmitting service data using the established network connections.

14 Claims, 8 Drawing Sheets

(51) Int. Cl.
  *H04M 15/00* (2006.01)
  *H04M 17/02* (2006.01)
  *H04M 17/00* (2006.01)
  *H04W 76/10* (2018.01)
  *H04W 12/06* (2009.01)

(52) U.S. Cl.
  CPC ......... *H04M 15/854* (2013.01); *H04M 17/02* (2013.01); *H04M 17/023* (2013.01); *H04M 17/103* (2013.01); *H04W 12/06* (2013.01); *H04W 76/10* (2018.02)

(58) Field of Classification Search
  USPC .......... 455/406, 433, 432.1, 435.1, 558, 411, 455/403
  See application file for complete search history.

(56) References Cited

U.S. PATENT DOCUMENTS

| | | | | |
|---|---|---|---|---|
| 9,137,675 | B2 * | 9/2015 | Rubin | H04W 16/28 |
| 9,144,082 | B2 * | 9/2015 | Rubin | H04W 72/12 |
| 9,219,541 | B2 * | 12/2015 | Rubin | H04B 7/26 |
| 9,369,938 | B2 * | 6/2016 | Biggs | H04W 36/385 |
| 2010/0311468 | A1 | 12/2010 | Shi | |
| 2013/0132854 | A1 * | 5/2013 | Raleigh | G06F 3/0482 715/738 |
| 2013/0217361 | A1 * | 8/2013 | Mohammed | H04W 4/50 455/411 |
| 2014/0024361 | A1 * | 1/2014 | Poon | H04W 12/06 455/419 |
| 2014/0057600 | A1 | 2/2014 | Dung | |
| 2014/0073289 | A1 * | 3/2014 | Velasco | H04W 12/04 455/411 |
| 2014/0199962 | A1 * | 7/2014 | Mohammed | H04M 15/70 455/406 |
| 2014/0373124 | A1 * | 12/2014 | Rubin | H04L 67/28 726/7 |
| 2015/0079945 | A1 * | 3/2015 | Rubin | H04W 12/08 455/411 |
| 2016/0007188 | A1 * | 1/2016 | Wane | H04W 4/50 455/419 |
| 2016/0050556 | A1 | 2/2016 | Zhao et al. | |
| 2016/0183178 | A1 * | 6/2016 | Marimuthu | H04W 4/023 455/432.1 |

FOREIGN PATENT DOCUMENTS

| | | |
|---|---|---|
| CN | 102917339 A | 2/2013 |
| CN | 103686669 A | 3/2014 |
| CN | 103987025 A | 8/2014 |
| CN | 104717629 A | 6/2015 |
| CN | 103916844 A | 7/2017 |
| EP | 2627109 A1 | 8/2013 |
| WO | 2014180324 A1 | 11/2014 |

OTHER PUBLICATIONS

English Translation of the Written Opinion of the International Search Authority in international application No. PCT/CN2015/086806, dated Jan. 27, 2016, 7 pgs.

Supplementary European Search Report in European application No. 15890522.4, dated Apr. 6, 2018, 23 pgs.

* cited by examiner

SERVICE DATA TRANSMISSION METHOD, TERMINAL AND CHARGING SYSTEM, COMPUTER STORAGE MEDIUM

TECHNICAL FIELD

The disclosure relates to communication techniques, and in particular to a service data transmission method for a Virtual-Subscriber Identity Module (V-SIM) card, a terminal and a charging system, and a computer storage medium.

BACKGROUND

With the rapid development of wireless access technologies, people have an increasing need for ubiquitous wireless Internet access. For some people engaged in a diverse range of businesses, besides the Internet access need in the local place, they have Internet access needs in foreign places too. However, the local network operator and the foreign network operator usually are different; for terminal users, roaming from one operator to another operator will generate high roaming fees. Of course, the terminal user may apply for the SIM card of the local operator; however, if the terminal user switches frequently between multiple regions, more troubles will be caused to the user.

SUMMARY

In order to solve the above technical problem, the embodiments of the disclosure provide a service data transmission method, a terminal and a charging system, and a computer storage medium.

The service data transmission method provided by an embodiment of the disclosure includes:

when it is detected that a terminal roams from a local place to a foreign place, Virtual-Subscriber Identity Module (V-SIM) card information about the foreign place is requested and acquired from a V-SIM card server;

a network connection that has been established using a Subscriber Identity Module (SIM) card is disconnected, and a network connection is established using the acquired V-SIM card information; and service data is transmitted using the established network connection.

In an embodiment of the disclosure, before the V-SIM card information about the foreign place is requested and acquired from the V-SIM card server, the method further includes:

a network access request message is sent to a network server using the SIM card information of the terminal about the local place; and after the network server successfully authenticates the SIM card information, a network access accepted message sent by the network server is received and a local network connection is established.

In another embodiment of the disclosure, the step that the V-SIM card information about the foreign place is requested and acquired from the V-SIM card server includes:

a V-SIM card information request and acquisition message is sent to the V-SIM card server; and after an authentication server authenticates the validity of the identity of the terminal and determines that it is valid and when a comprehensive charging server determines that a user of the terminal has credit in his/her account, the V-SIM card information about the foreign place sent by the V-SIM card server is received.

In another embodiment of the disclosure, the method further comprises:

when service data are transmitted using the established network connection, Internet traffic is statistically gathered;

the statistically gathered Internet traffic is periodically reported to the comprehensive charging server;

when the comprehensive charging server calculates according to the reported Internet traffic that a user of the terminal has data traffic to use and the V-SIM card has no data traffic to use, a release message sent by the comprehensive charging server is received and the acquired V-SIM card information is released; a foreign network connection is established using the V-SIM card information reacquired;

when the comprehensive charging server calculates according to the reported Internet traffic that a user of the terminal has no data traffic to use, a release message sent by the comprehensive charging server is received and the acquired V-SIM card information is released; after the comprehensive charging server recovers the V-SIM card information, the established foreign network connection is disconnected.

In another embodiment of the disclosure, the method further includes:

when the comprehensive charging server detects that the data plan subscribed at the terminal expires, a V-SIM card information release request message is sent to the V-SIM card server;

after the V-SIM card server recovers the V-SIM card information, the established foreign network connection is disconnected.

In another embodiment of the disclosure, the method further includes:

when receiving a message requesting for disconnection of a foreign network connection, a V-SIM card information release request message is sent to the V-SIM card server; and after the V-SIM card server recovers the V-SIM card information, the established foreign network connection is disconnected.

The service data transmission method provided by another embodiment of the disclosure includes:

a V-SIM card server receives a request sent by a terminal to acquire V-SIM card information about a foreign place, wherein the terminal roams from a local place to the foreign place; and the V-SIM card server sends the V-SIM card information about the foreign place to the terminal, so that the terminal establishes, after disconnecting a local connection, a foreign network connection using the V-SIM card information and transmits service data.

In an embodiment of the disclosure, before the V-SIM card server receives the request sent by the terminal to acquire the V-SIM card information about the foreign place, the method further includes:

a network server receives a network access request message sent by the terminal using the SIM card information about the local place; and after the network server successfully authenticates the SIM card information, a network access accepted message is sent to the terminal so that the terminal establishes a local network connection.

In another embodiment of the disclosure, before the V-SIM card server sends the V-SIM card information about the foreign place to the terminal, the method further includes:

after the V-SIM card server receives the request sent by the terminal to acquire the V-SIM card information about the foreign place, a terminal identity validity determination message is sent to an authentication server;

the authentication server determines whether the identity of the terminal is valid; after the authentication server authenticates the validity of the identity of the terminal and determines that it is valid, a terminal identity validity response message is sent to the V-SIM card server;

after the V-SIM card server receives the terminal identity validity response message, a terminal fee query message is sent to a comprehensive charging server;

the comprehensive charging server returns fee information about the terminal to the V-SIM card server; and the V-SIM card server determines whether a user of the terminal has credit in his/her account according to the fee information returned by the comprehensive charging server; when a user of the terminal has credit in his/her account, the V-SIM card information about the foreign place is searched for.

The terminal provided by an embodiment of the disclosure includes:

a request and acquisition unit arranged to: when it is detected that the terminal roams from a local place to a foreign place, request and acquire V-SIM card information about the foreign place from a V-SIM card server;

a connection establishment unit arranged to disconnect a network connection that has been established using an SIM card and establish a network connection using the acquired V-SIM card information; and a service data unit arranged to transmit service data using the established network connection.

In an embodiment of the disclosure, the terminal further includes:

a first sending unit arranged to send a network access request message to a network server using the SIM card information of the terminal about the local place; and a first receiving unit arranged to: after the network server successfully authenticates the SIM card information, receive a network access accepted message sent by the network server and establish a local network connection.

In another embodiment of the disclosure, the request and acquisition unit includes:

a sending subunit arranged to send a V-SIM card information request and acquisition message to the V-SIM card server; and a receiving subunit arranged to: after an authentication server authenticates the validity of the identity of the terminal and determines that it is valid and when a comprehensive charging server determines that a user of the terminal has credit in his/her account, receive the V-SIM card information about the foreign place sent by the V-SIM card server.

In another embodiment of the disclosure, the terminal further includes:

a statistical unit arranged to: when service data are transmitted using the established network connection, gather statistics on Internet traffic;

a report unit arranged to periodically report the statistically gathered Internet traffic to the comprehensive charging server;

a re-establishment unit arranged to: when the comprehensive charging server calculates according to the reported Internet traffic that a user of the terminal has data traffic to use and the V-SIM card has no data traffic to use, receive a release message sent by the comprehensive charging server and release the acquired V-SIM card information; establish a foreign network connection using the V-SIM card information reacquired; and a release unit arranged to: when the comprehensive charging server calculates according to the reported Internet traffic that the user of the terminal has no data traffic to use, receive a release message sent by the comprehensive charging server and release the acquired V-SIM card information; after the comprehensive charging server recovers the V-SIM card information, disconnect the established foreign network connection.

In another embodiment of the disclosure, the terminal further includes:

a second sending unit arranged to: when the comprehensive charging server detects that the data plan subscribed at the terminal expires, send a V-SIM card information release request message to the V-SIM card server;

a disconnection unit arranged to: after the V-SIM card server recovers the V-SIM card information, disconnect the established foreign network connection.

In another embodiment of the disclosure, the terminal further includes:

a third sending unit arranged to: when receiving a message requesting for disconnection of a foreign network connection, send a V-SIM card information release request message to the V-SIM card server; and a disconnection unit arranged to: after the V-SIM card server recovers the V-SIM card information, disconnect the established foreign network connection.

The charging system provided by the embodiment of the disclosure includes:

a V-SIM card server arranged to receive a request sent by a terminal to acquire V-SIM card information about a foreign place, wherein the terminal roams from a local place to the foreign place, wherein the V-SIM card server is further arranged to send the V-SIM card information about the foreign place to the terminal, so that the terminal establishes, after disconnecting a local connection, a foreign network connection using the V-SIM card information and transmits service data.

In an embodiment of the disclosure, the charging system further includes an authentication server and a comprehensive charging server, wherein the V-SIM card server is further arranged to: after receiving the request sent by the terminal to acquire the V-SIM card information about the foreign place, send a terminal identity validity determination message to the authentication server;

the authentication server is further arranged to: determine whether the identity of the terminal is valid; and, after authenticating the validity of the identity of the terminal and determining that it is valid, send a terminal identity validity response message to the V-SIM card server;

the V-SIM card server is further arranged to: after receiving the terminal identity validity response message, send a terminal fee query message to the comprehensive charging server;

the comprehensive charging server is further arranged to return fee information about the terminal to the V-SIM card server; and the V-SIM card server is further arranged to: determine whether a user of the terminal has credit in his/her account according to the fee information returned by the comprehensive charging server; and, when a user of the terminal has credit in his/her account, search for the V-SIM card information about the foreign place.

The computer storage medium provided by an embodiment of the disclosure stores computer executable instructions arranged to execute the service data transmission method described above.

In the technical scheme of the embodiment of the disclosure, a new charging system is added on the basis of the original network; the charging system includes a V-SIM card server, an authentication server and a comprehensive charging server. The charging system purchases V-SIM cards and data plans from operators of multiple regions, stores the V-SIM card information on the V-SIM card server and stores the data plans information on the comprehensive charging server. The terminal user purchases data plans from the charging system and stores the information on the authentication server and the comprehensive charging server. When the terminal roams from a local place to a foreign place, the terminal applies for and acquires the V-SIM card information about the foreign place from the V-SIM card server. The terminal disconnects the network connection established using the SIM card, and establishes a network connection using the acquired V-SIM card information; then, the terminal transmits service data on the established network connection. In this way, high roaming fees are avoided when the terminal is in the roaming state. In addition, the charging system in the embodiment of the disclosure is simple in environment setup, the comprehensive charging server is independent, thus, good user experience is provided and product competitiveness is improved.

DETAILED DESCRIPTION

Figure 1:
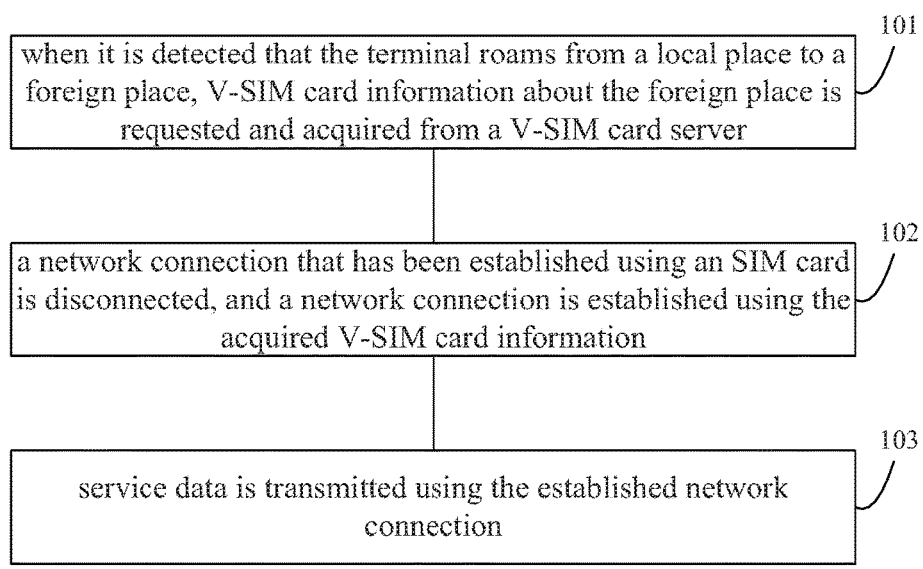
FIG. 1 is a flowchart of a service data transmission method of an Embodiment 1 of the disclosure.

To better understand the features and technical contents of the embodiments of the disclosure, a detailed illustration is given below to the implementation of the embodiments of the disclosure in conjunction with the drawing. The attached drawings are only for reference, but to limit the embodiments of the disclosure.

FIG. 1 is a flowchart of a service data transmission method of an Embodiment 1 of the disclosure. In this embodiment, the service data transmission method should be arranged at a terminal; as shown in FIG. 1, the service data transmission method includes the following steps:

In Step 101: when it is detected that the terminal roams from a local place to a foreign place, V-SIM card information about the foreign place is requested and acquired from a V-SIM card server.

In the embodiment of the disclosure, the terminal may be a mobile phone, a tablet computer and other electronic equipment; the terminal is internally equipped with an SIM card, which is called a local SIM card; one SIM card corresponds to an operator, which is called a local operator; when the terminal is in the local place, for example, region A, the operator of the region A charges for the Internet traffic of the terminal. If the terminal roams from the local place to a foreign place, for example, roaming from region A to region B, the charging system in the embodiment of the disclosure charges for the Internet traffic of the terminal. Here, the new charging system includes three network elements, namely, a V-SIM card server, an authentication server and a comprehensive charging server. The charging system purchases data plans from multiple operators and stores the plan information on the comprehensive charging server. Then, the terminal purchases the data plan from the charging system, and stores the purchased data plan information on the comprehensive server.

In the embodiment of the disclosure, before the V-SIM card information about the foreign place is requested and acquired from the V-SIM card server, the method further includes:

a network access request message is sent to a network server using the SIM card information of the terminal about the local place; and after the network server successfully authenticates the SIM card information, a network access accepted message sent by the network server is received and a local network connection is established.

Specifically, when the terminal accesses Internet using dial-up, the terminal first completes authentication and authorization, then receives the Mobile Country Code (MCC) and Mobile Network Code (MNC) sent by the network server and stores the MCC and MNC.

In the embodiment of the disclosure, the step that the V-SIM card information about the foreign place is requested and acquired from the V-SIM card server includes:

a V-SIM card information request and acquisition message is sent to the V-SIM card server; and after an authentication server authenticates the validity of the identity of the terminal and determines that it is valid and when a comprehensive charging server determines that a user of the terminal has credit in his/her account, the V-SIM card information about the foreign place sent by the V-SIM card server is received.

In the above scheme, after the authentication server authenticates the validity of the identity of the terminal and determines that it is invalid, or when the comprehensive charging server determines that the terminal has no fees, a corresponding identity authentication invalidity message or terminal fees run out message is returned to the terminal.

In Step 102: a network connection that has been established using an SIM card is disconnected, and a network connection is established using the acquired V-SIM card information.

In Step 103: service data is transmitted using the established network connection.

In the embodiment of the disclosure, when service data is transmitted using the established network connection, Internet traffic is statistically gathered; the statistically gathered Internet traffic is periodically reported to the comprehensive charging server; when the comprehensive charging server calculates according to the reported Internet traffic that a user of the terminal has data traffic to use and the V-SIM card has no data traffic to use, a release message sent by the comprehensive charging server is received and the acquired V-SIM card information is released; a foreign network connection is established using the V-SIM card information reacquired; when the comprehensive charging server calculates according to the reported Internet traffic that the user of the terminal has no data traffic to use, a release message sent by the comprehensive charging server is received and the acquired V-SIM card information is released; after the comprehensive charging server recovers the V-SIM card information, the established foreign network connection is disconnected.

In the embodiment of the disclosure, when the comprehensive charging server detects that the data plan subscribed at the terminal expires, a V-SIM card information release request message is sent to the V-SIM card server; after the V-SIM card server recovers the V-SIM card information, the established foreign network connection is disconnected.

In the embodiment of the disclosure, when receiving a message requesting for disconnection of a foreign network connection, a V-SIM card information release request message is sent to the V-SIM card server; and, after the V-SIM card server recovers the V-SIM card information, the established foreign network connection is disconnected.

In the technical scheme of the embodiment of the disclosure, a new charging system is added on the basis of the original network; the charging system includes a V-SIM card server, an authentication server and a comprehensive charging server. The charging system purchases V-SIM cards and data plans from operators of multiple regions, stores the V-SIM card information on the V-SIM card server and stores the data plans information on the comprehensive charging server. The terminal user purchases data plans from the charging system and stores the information on the authentication server and the comprehensive charging server. When the terminal roams from a local place to a foreign place, the terminal applies for and acquires the V-SIM card information about the foreign place from the V-SIM card server. The terminal disconnects the network connection established using the SIM card, and establishes a network connection using the acquired V-SIM card information; then, the terminal transmits service data on the established network connection. In this way, high roaming fees are avoided when the terminal is in the roaming state. In addition, the charging system in the embodiment of the disclosure is simple in environment setup, the comprehensive charging server is independent, thus, good user experience is provided and product competitiveness is improved.

Figure 2:
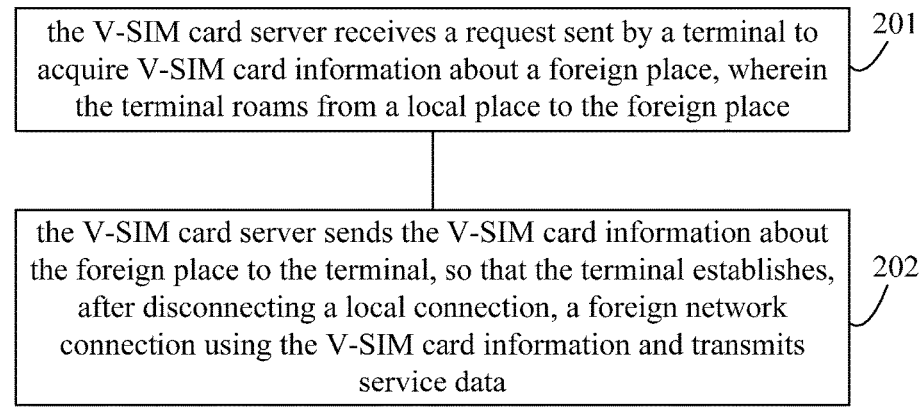
FIG. 2 is a flowchart of a service data transmission method of an Embodiment 2 of the disclosure.

FIG. 2 is a flowchart of a service data transmission method of an Embodiment 2 of the disclosure. The service data transmission method in this embodiment should be arranged at a charging system. The charging system includes three network elements, namely, a V-SIM card server, an authentication server and a comprehensive charging server. As shown in FIG. 2, the service data transmission method includes the following steps:

In Step 201: the V-SIM card server receives a request sent by a terminal to acquire V-SIM card information about a foreign place, wherein the terminal roams from a local place to the foreign place;

In the embodiment of the disclosure, before the V-SIM card server receives the request sent by the terminal to acquire the V-SIM card information about the foreign place, the method further includes:

a network server receives a network access request message sent by the terminal using the SIM card information about the local place; and after the network server successfully authenticates the SIM card information, a network access accepted message is sent to the terminal so that the terminal establishes a local network connection.

In Step 202: the V-SIM card server sends the V-SIM card information about the foreign place to the terminal, so that the terminal establishes, after disconnecting a local connection, a foreign network connection using the V-SIM card information and transmits service data.

In the embodiment of the disclosure, before the V-SIM card server sends the V-SIM card information about the foreign place to the terminal, the method further includes:

after the V-SIM card server receives the request sent by the terminal to acquire the V-SIM card information about the foreign place, a terminal identity validity determination message is sent to the authentication server;

the authentication server determines whether the identity of the terminal is valid; after the authentication server authenticates the validity of the identity of the terminal and determines that it is valid, a terminal identity validity response message is sent to the V-SIM card server;

after the V-SIM card server receives the terminal identity validity response message, a terminal fee query message is sent to the comprehensive charging server;

the comprehensive charging server returns fee information about the terminal to the V-SIM card server; and the V-SIM card server determines whether a user of the terminal has credit in his/her account according to the fee information returned by the comprehensive charging server; when a user of the terminal has credit in his/her account, the V-SIM card information about the foreign place is searched for.

In the above scheme, after the authentication server authenticates the validity of the identity of the terminal and determines that it is invalid, or when the comprehensive charging server determines that the terminal has no fees, a corresponding identity authentication invalidity message or terminal fees run out message is returned to the terminal.

Through the technical scheme of the embodiment of the disclosure, high roaming fees are avoided when the terminal is in the roaming state. In addition, the charging system in the embodiment of the disclosure is simple in environment setup, the comprehensive charging server is independent, thus, good user experience is provided and product competitiveness is improved.

Figure 3:
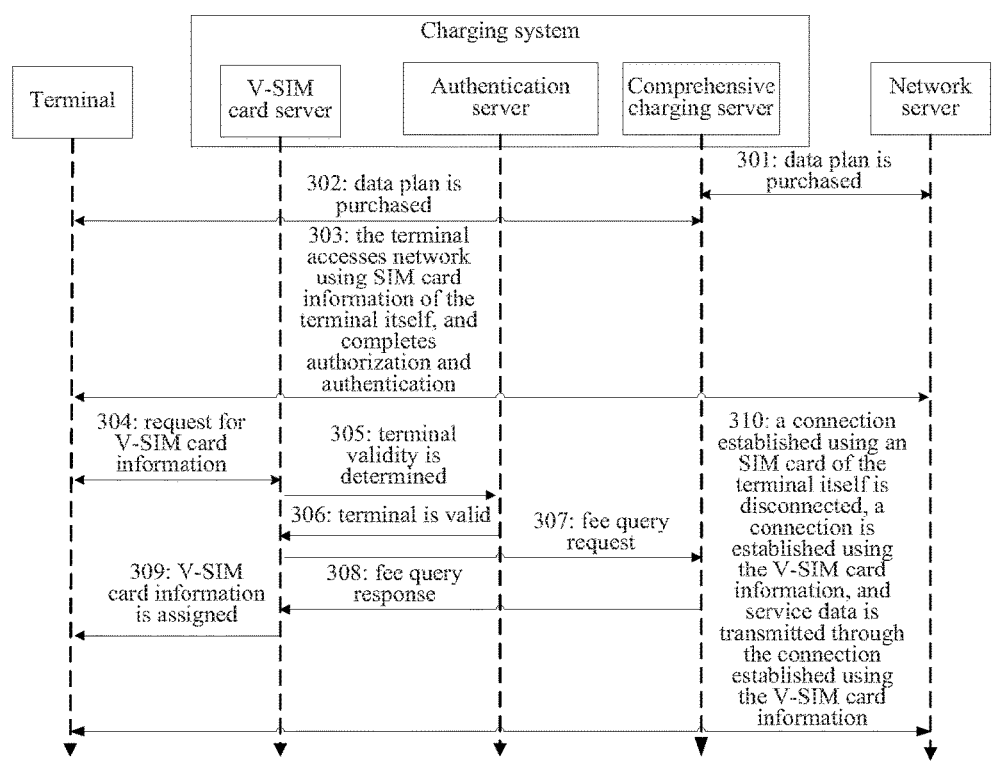
FIG. 3 is a flowchart of a service data transmission method of an Embodiment 3 of the disclosure.

FIG. 3 is a flowchart of a service data transmission method of an Embodiment 3 of the disclosure. As shown in FIG. 3, the service data transmission method includes the following steps:

In Step 301: the charging system purchases data plans from multiple network servers, and stores the data plan information on the comprehensive charging server.

In Step 302: a terminal user purchases a data plan from the charging system and stores the purchased data plan information on the comprehensive charging server.

In Step 303: the terminal accesses a network using SIM card information of the terminal itself, and completes authorization and authentication.

In Step 304: the terminal sends a request for V-SIM card information to the V-SIM card server.

In Step 305: after the V-SIM card server receives the request for V-SIM card information, the V-SIM card server sends a terminal validity determination message to the authentication server.

In Step 306: the authentication server determines whether the identity of the terminal is valid; if the identity of the terminal is invalid, an identity invalidity response is returned to the terminal, the process is ended. If the identity of the terminal is valid, the authentication server sends a terminal identity validity response message to the V-SIM card server.

In Step 307: after the V-SIM card server receives the terminal identity validity response message, the V-SIM card server sends a terminal fee query message to the comprehensive charging server.

In Step 308: the comprehensive charging server returns a fee query response message to the V-SIM card server so as to feed back the fee information about the terminal.

In Step 309: the V-SIM card server determines whether a user of the terminal has credit in his/her account according to the returned fee information; if the credit in the terminal user's account is run out, the V-SIM card server returns a V-SIM card assignment failure message to the terminal, the process is ended. If the user of the terminal has credit in his/her account to use, the V-SIM card server searches for appropriate V-SIM card information, if no appropriate V-SIM card information is searched out, a V-SIM card information assignment failure response message is sent to the terminal, the process is ended. If appropriate V-SIM card information is searched out, the assigned V-SIM card information is returned to the terminal.

In Step 310: after the terminal acquires the V-SIM card information, the terminal disconnects the connection established using the SIM card of the terminal itself, and establishes a connection using the requested V-SIM card information and transmits service data.

Figure 4:
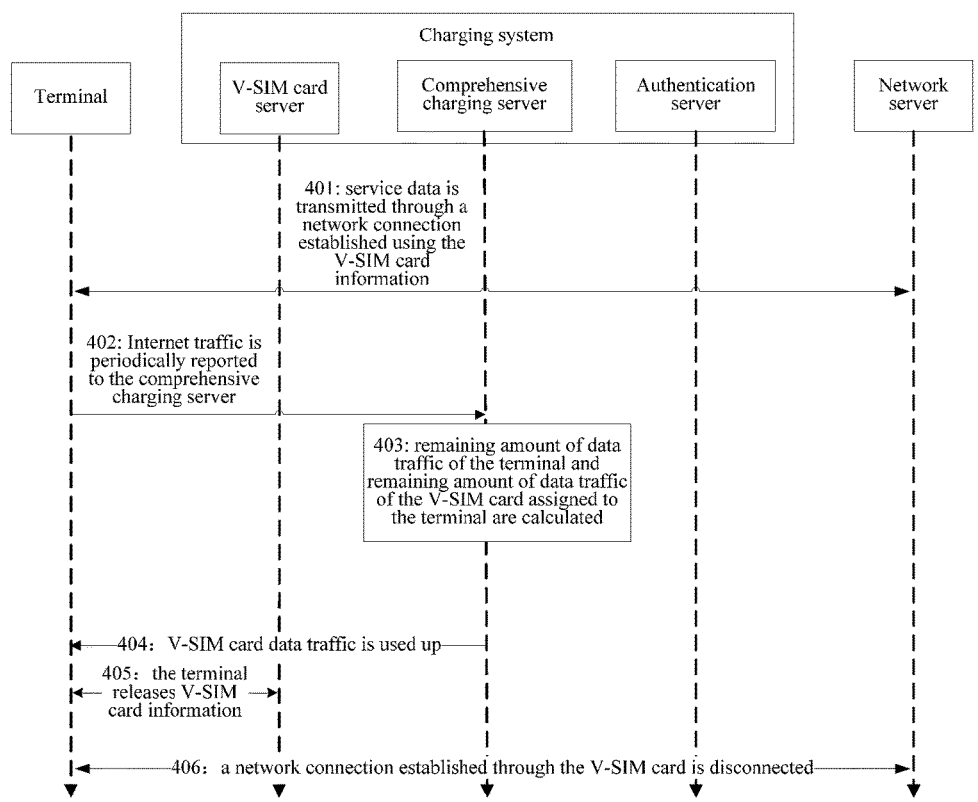
FIG. 4 is flowchart of the V-SIM release of the embodiment of the disclosure.

FIG. 4 is flowchart of the V-SIM release of the embodiment of the disclosure. As shown in FIG. 4, the V-SIM release process includes the following steps:

In Step 401: the terminal transmits service data on the network connection established using the V-SIM card information.

In Step 402: the terminal gathers statistics on Internet traffic, and periodically reports to the comprehensive charging server.

In Step 403: the comprehensive charging server calculates remaining amount of the data traffic of the terminal user and remaining amount of the data traffic of the V-SIM card assigned to the terminal according to the reported Internet traffic.

In Step 404: if both the terminal user and the V-SIM card assigned to the terminal have data traffic to use, the comprehensive charging server returns to the terminal that a user of the terminal has credit in his/her account to use. If the terminal user has data traffic to use, but the V-SIM card assigned to the terminal has no traffic data to use, the comprehensive charging server notifies the terminal to release the V-SIM card information and re-request V-SIM card information. If the terminal user has no traffic data to use, the comprehensive charging server sends a V-SIM card information release message to the terminal.

In Step 405: the terminal sends a V-SIM information release request message to the V-SIM card server, the V-SIM card server recovers the V-SIM card information and returns a V-SIM information release success message to the terminal.

In Step 406: the terminal disconnects the network connection established using the V-SIM card.

Figure 5:
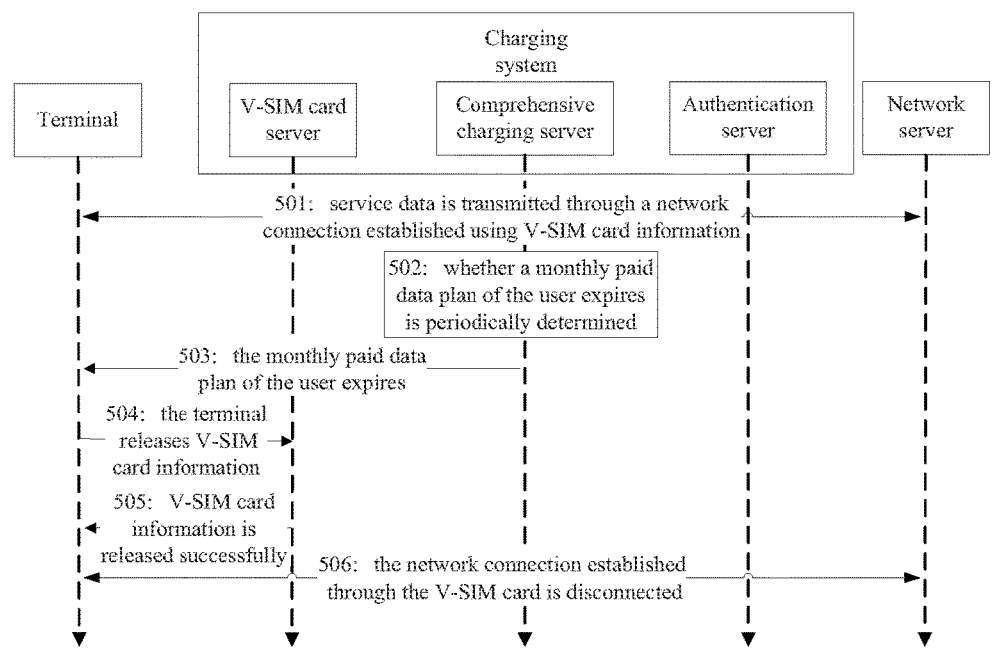
FIG. 5 is a flowchart of the V-SIM release of a user of monthly payment of the embodiment of the disclosure.

FIG. 5 is a flowchart of the V-SIM release of a user of monthly payment of the embodiment of the disclosure. As shown in FIG. 5, the V-SIM release process of a user of monthly payment includes the following steps:

In Step 501: the terminal transmits service data on the network connection established using the V-SIM card information.

In Step 502: the comprehensive charging server periodically determines whether the monthly paid data plan of the user expires.

In Step 503: if the monthly paid data plan of the user expires, the comprehensive charging server sends a monthly paid data plan expired message to the terminal.

In Step 504: the terminal sends a V-SIM information release request message to the V-SIM card server.

In Step 505: the V-SIM card server recovers the V-SIM card information, and returns a V-SIM information release success message to the terminal user.

In Step 506: the terminal disconnects the network connection established using the V-SIM card.

Figure 6:
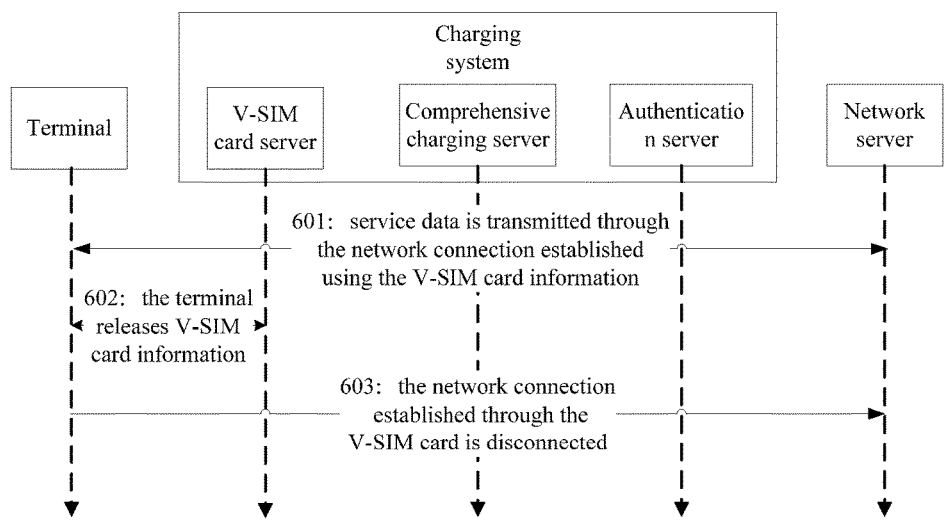
FIG. 6 is a flowchart of the disconnection V-SIM release of the embodiment of the disclosure.

FIG. 6 is a flowchart of the disconnection V-SIM release of the embodiment of the disclosure. As shown in FIG. 6, the disconnection V-SIM release process includes the following steps:

In Step 601: the terminal transmits service data on the network connection established using the V-SIM card information In Step 602: when the terminal is to disconnect the data connection, the terminal first releases the requested V-SIM information.

In Step 603: the terminal disconnects the network connection established using the V-SIM card.

Figure 7:
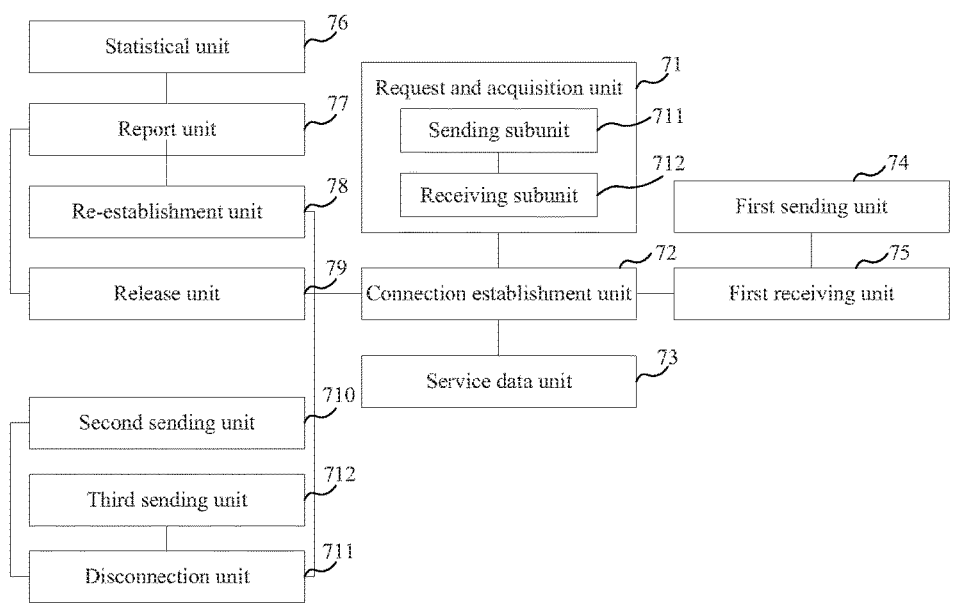
FIG. 7 is a structure diagram of a terminal of the embodiment of the disclosure.

FIG. 7 is a structure diagram of a terminal of the embodiment of the disclosure. As shown in FIG. 7, the terminal includes:

a request and acquisition unit 71 arranged to: when it is detected that the terminal roams from a local place to a foreign place, request and acquire V-SIM card information about the foreign place from a V-SIM card server;

a connection establishment unit 72 arranged to disconnect a network connection that has been established using an SIM card and establish a network connection using the acquired V-SIM card information; and a service data unit 73 arranged to transmit service data using the established network connection.

In an embodiment of the disclosure, the terminal further includes:

a first sending unit 74 arranged to send a network access request message to a network server using the SIM card information of the terminal about the local place; and a first receiving unit 75 arranged to: after the network server successfully authenticates the SIM card information, receive a network access accepted message sent by the network server and establish a local network connection.

In another embodiment of the disclosure, the request and acquisition unit 71 includes:

a sending subunit 711 arranged to send a V-SIM card information request and acquisition message to the V-SIM card server; and a receiving subunit 712 arranged to: after an authentication server authenticates the validity of the identity of the terminal and determines that it is valid and when a comprehensive charging server determines that a user of the terminal has credit in his/her account, receive the V-SIM card information about the foreign place sent by the V-SIM card server.

In another embodiment of the disclosure, the terminal further includes:

a statistical unit 76 arranged to: when service data are transmitted using the established network connection, gather statistics on Internet traffic;

a report unit 77 arranged to periodically report the statistically gathered Internet traffic to the comprehensive charging server;

a re-establishment unit 78 arranged to: when the comprehensive charging server calculates according to the reported Internet traffic that a user of the terminal has data traffic to use and the V-SIM card has no data traffic to use, receive a release message sent by the comprehensive charging server and release the acquired V-SIM card information; establish a foreign network connection using the V-SIM card information reacquired; and a release unit 79 arranged to: when the comprehensive charging server calculates according to the reported Internet traffic that the user of the terminal has no data traffic to use, receive a release message sent by the comprehensive charging server and release the acquired V-SIM card information; after the comprehensive charging server recovers the V-SIM card information, disconnect the established foreign network connection.

In another embodiment of the disclosure, the terminal further includes:

a second sending unit 710 arranged to: when the comprehensive charging server detects that the data plan subscribed at the terminal expires, send a V-SIM card information release request message to the V-SIM card server;

a disconnection unit 711 arranged to: after the V-SIM card server recovers the V-SIM card information, disconnect the established foreign network connection.

In another embodiment of the disclosure, the terminal further includes:

a third sending unit 712 arranged to: when receiving a message requesting for disconnection of a foreign network connection, send a V-SIM card information release request message to the V-SIM card server; and a disconnection unit 711 arranged to: after the V-SIM card server recovers the V-SIM card information, disconnect the established foreign network connection.

In actual application, each unit in the terminal may be realized by a Central Processing Unit (CPU), a Micro Processor Unit (MPU), a Digital Signal Processor (DSP), or a Field Programmable Gate Array (FPGA), etc. located in the terminal.

Those skilled in the art should understand that the implementation functions of each unit in the terminal shown in FIG. 7 and subunits thereof may be understood by reference to the relevant description of the service data transmission method described above. The functions of each unit in the terminal shown in FIG. 7 and subunits thereof may be realized through a program running on the processor, also may be realized through a specific logical circuit.

Figure 8:
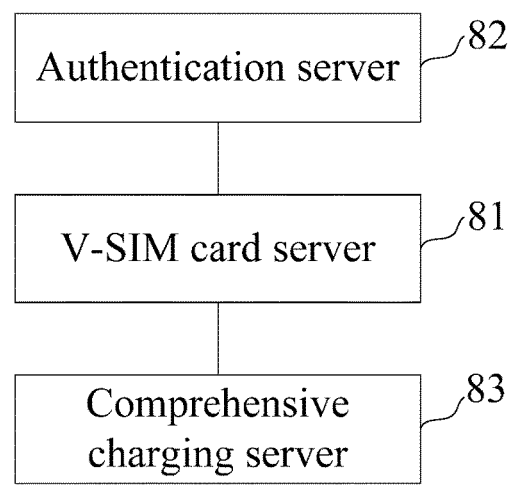
FIG. 8 is a structure diagram of a charging system of the embodiment of the disclosure.

FIG. 8 is a structure diagram of a charging system of the embodiment of the disclosure. As shown in FIG. 8, the charging system includes:

a V-SIM card server 81 arranged to receive a request sent by a terminal to acquire V-SIM card information about a foreign place, wherein the terminal roams from a local place to the foreign place, wherein the V-SIM card server 81 is further arranged to send the V-SIM card information about the foreign place to the terminal, so that the terminal establishes, after disconnecting a local connection, a foreign network connection using the V-SIM card information and transmits service data.

In an embodiment, the charging system further includes an authentication server 82 and a comprehensive charging server 83, wherein the V-SIM card server 81 is further arranged to: after receiving the request sent by the terminal to acquire the V-SIM card information about the foreign place, send a terminal identity validity determination message to the authentication server 82;

the authentication server 82 is further arranged to: determine whether the identity of the terminal is valid; and, after authenticating the validity of the identity of the terminal and determining that it is valid, send a terminal identity validity response message to the V-SIM card server 81;

the V-SIM card server 81 is further arranged to: after receiving the terminal identity validity response message, send a terminal fee query message to the comprehensive charging server 83;

the comprehensive charging server 83 is further arranged to return fee information about the terminal to the V-SIM card server 81; and the V-SIM card server 81 is further arranged to: determine whether a user of the terminal has credit in his/her account according to the fee information returned by the comprehensive charging server 83; and, when a user of the terminal has credit in his/her account, search for the V-SIM card information about the foreign place.

In the embodiment of the disclosure, a network server receives a network access request message sent by the terminal using the SIM card information about the local place; and, after the network server successfully authenticates the SIM card information, the network server sends a network access accepted message to the terminal so that the terminal establishes a local network connection.

Those skilled in the art should understand that the implementation functions of each network element in the charging system shown in FIG. 8 may be understood by reference to the relevant description of the service data transmission method described above.

When the above device for service signaling tracking in the embodiment of the disclosure is realized in the form of software function modules and is sold or used as an independent product, it may be stored in computer readable storage medium. Based on this understanding, the technical scheme of the embodiment of the disclosure or the part making a contribution to the existing technology on essence can be embodied in the form of software product. This computer software product is stored in a storage medium, including a number of instructions that enable a computer device (which might be a personal computer, a server or a network device, etc.) to execute part or the entirety of the method described in each embodiment of the disclosure. The aforementioned storage medium includes: USB flash disk, mobile hard disk, Read-Only Memory (ROM), Random Access Memory (RAM), diskette or compact disc and various mediums capable of storing program codes. In this way, the embodiment of the disclosure is not limited to any specific combination of hardware and software.

Correspondingly, an embodiment of the disclosure further provides a computer storage medium having stored therein executable instructions arranged to execute the service data transmission method according to the embodiments of the disclosure.

In the embodiments provided in this application, it should be understood that the disclosed device and method may be realized through other ways. The device embodiments described above are exemplary only, for example, the division of unit is a division of logical function merely, and may select other division methods during actual implementation, for example, a plurality of units or components may be combined, or may be integrated into another system, or some feature may be neglected or not executed. In addition, the mutual coupling, or direct coupling, or communication connection between the displayed or discussed components may be realized through some interfaces; the indirect coupling or communication connection between devices or units may be electrically, mechanically or in other forms.

The above unit described as a separate component may be or may not be physically separated; the component, displayed as a unit, may be or may not be a physical unit, that is, it may be located at one place, or may be distributed on a plurality of network units. Part or all units may be selected to realize the purpose of the embodiment scheme according to actual needs.

In addition, each function unit in each embodiment of the disclosure may be integrated in a processing unit, or each unit serves as a unit separately, or two or more units are integrated in a unit. The above integrated units may be realized in the form of hardware, or in the form of a hardware plus software function unit.

The ordinary staff in this field can understand that: all or part steps to implement the above method embodiments may be completed through a program instructing related hardware, the program may be stored in a computer readable storage medium and executes the steps including the above method embodiments during execution. The storage medium includes: mobile storage device, ROM, RAM, disk or compact disk and various mediums capable of storing program codes.

Or, when the integrated units in the embodiment of the disclosure are realized in the form of software function modules and are sold or used as an independent product, they may be stored in computer readable storage medium. Based on this understanding, the technical scheme of the embodiment of the disclosure or the part making a contribution to the existing technology on essence can be embodied in the form of software product. This computer software product is stored in a storage medium, including a number of instructions that enables a computer device (which might be a computer, a server or a network device, etc.) to execute part or the entirety of the method described in each embodiment of the disclosure. The aforementioned storage medium includes: USB flash disk, mobile hard disk, ROM, RAM, diskette or compact disc and various mediums capable of storing program codes.

The above are the specific embodiments of the disclosure merely; however, the protection scope of the disclosure is not limited to this; any variations or substitutions easily thought by one skill familiar with the technical field are intended to be within the scope of protection of the disclosure. Therefore, the scope of protection of the disclosure should be based on the protection scope of claims appended herein.

The invention claimed is:

1. A service data transmission method, comprising:
when it is detected that a terminal roams from a local place to a foreign place, requesting and acquiring Virtual-Subscriber Identity Module (V-SIM) card information about the foreign place from a V-SIM card server;
disconnecting a network connection that has been established using a Subscriber Identity Module (SIM) card, and establishing a network connection using the acquired V-SIM card information; and
transmitting service data using the established network connection;
the method further comprising:
when service data are transmitted using the established network connection, gathering statistics on Internet traffic;
periodically reporting the statistically gathered Internet traffic to a comprehensive charging server;
when the comprehensive charging server calculates according to the reported Internet traffic that a user of the terminal has data traffic to use and a V-SIM card has no data traffic to use, receiving a release message sent by the comprehensive charging server and releasing the acquired V-SIM card information; establishing a foreign network connection using reacquired V-SIM card information; and
when the comprehensive charging server calculates according to the reported Internet traffic that the user of the terminal has no data traffic to use, receiving a release message sent by the comprehensive charging server and releasing the acquired V-SIM card information; after the comprehensive charging server recovers the V-SIM card information, disconnecting the established foreign network connection.

2. The service data transmission method according to claim 1, further comprising: before requesting and acquiring the V-SIM card information about the foreign place from the V-SIM card server,
sending a network access request message to a network server using SIM card information of the terminal about the local place; and
after the network server successfully authenticates the SIM card information, receiving a network access accepted message sent by the network server and establishing a local network connection.

3. The service data transmission method according to claim 1, wherein requesting and acquiring the V-SIM card information about the foreign place from the V-SIM card server comprises:
sending a V-SIM card information request and acquisition message to the V-SIM card server; and
after an authentication server authenticates the validity of the identity of the terminal and determines that it is valid and when the comprehensive charging server determines that the user of the terminal has credit in his/her account, receiving the V-SIM card information about the foreign place sent by the V-SIM card server.

4. The service data transmission method according to claim 1, further comprising:
when the comprehensive charging server detects that a data plan subscribed at the terminal expires, sending a V-SIM card information release request message to the V-SIM card server; and
after the V-SIM card server recovers the V-SIM card information, disconnecting the established foreign network connection.

5. The service data transmission method according to claim 1, further comprising:
when receiving a message requesting disconnection of a foreign network connection, sending a V-SIM card information release request message to the V-SIM card server; and
after the V-SIM card server recovers the V-SIM card information, disconnecting the established foreign network connection.

6. A service data transmission method, comprising:
receiving, by a Virtual-Subscriber Identity Module (V-SIM) card server, a request sent by a terminal to acquire V-SIM card information about a foreign place, wherein the terminal roams from a local place to the foreign place; and
sending, by the V-SIM card server, the V-SIM card information about the foreign place to the terminal, so that the terminal establishes, after disconnecting a local connection, a foreign network connection using the V-SIM card information and transmits service data;
the method further comprising:
before, sending, by the V-SIM card server, the V-SIM card information about the foreign place to the terminal, after the V-SIM card server receives the request sent by the terminal to acquire the V-SIM card information about the foreign place, sending a terminal identity validity determination message to an authentication server;

determining, by the authentication server, whether the identity of the terminal is valid; after the authentication server authenticates the validity of the identity of the terminal and determines that it is valid, sending a terminal identity validity response message to the V-SIM card server;

after the V-SIM card server receives the terminal identity validity response message, sending a terminal fee query message to a comprehensive charging server;

returning, by the comprehensive charging server, fee information about the terminal to the V-SIM card server; and determining, by the V-SIM card server, whether a user of the terminal has credit in his/her account according to the fee information returned by the comprehensive charging server; when the user of the terminal has credit in his/her account, searching for the V-SIM card information about the foreign place.

7. The service data transmission method according to claim 6, further comprising: before receiving, by the V-SIM card server, the request sent by the terminal to acquire the V-SIM card information about the foreign place, receiving, by a network server, a network access request message sent by the terminal using Subscriber Identity Module (SIM) card information about the local place; and after the network server successfully authenticates the SIM card information, sending a network access accepted message to the terminal so that the terminal establishes a local network connection.

8. A terminal, comprising:

a memory storing processor-executable instructions; and a processor arranged to execute the stored processor-executable instructions to perform:

when it is detected that a terminal roams from a local place to a foreign place, requesting and acquiring Virtual-Subscriber Identity Module (V-SIM) card information about the foreign place from a V-SIM card server;

disconnecting a network connection that has been established using a Subscriber Identity Module (SIM) card, and establishing a network connection using the acquired V-SIM card information; and transmitting service data using the established network connection;

wherein the processor is further arranged to execute the stored processor-executable instructions to perform;

when service data are transmitted using the established network connection, gathering statistics on Internet traffic;

periodically reporting the statistically gathered Internet traffic to the comprehensive charging server;

when the comprehensive charging server calculates according to the reported Internet traffic that a user of the terminal has data traffic to use and a V-SIM card has no data traffic to use, receiving a release message sent by the comprehensive charging server and release the acquired V-SIM card information; establishing a foreign network connection using the V-SIM card information reacquired; and when the comprehensive charging server calculates according to the reported Internet traffic that the user of the terminal has no data traffic to use, receiving a release message sent by the comprehensive charging server and release the acquired V-SIM card information; after the comprehensive charging server recovers the V-SIM card information, disconnecting the established foreign network connection.

9. The terminal according to claim 8, wherein the processor is further arranged to execute the stored processor-executable instructions to perform: before requesting and acquiring the V-SIM card information about the foreign place from the V-SIM card server, sending a network access request message to a network server using the SIM card information of the terminal about the local place; and after the network server successfully authenticates the SIM card information, receiving a network access accepted message sent by the network server and establish a local network connection.

10. The terminal according to claim 8, wherein the processor is further arranged to execute the stored processor-executable instructions to perform:

sending a V-SIM card information request and acquisition message to the V-SIM card server; and after an authentication server authenticates the validity of the identity of the terminal and determines that it is valid and when the comprehensive charging server determines that the user of the terminal has credit in his/her account, receiving the V-SIM card information about the foreign place sent by the V-SIM card server.

11. The terminal according to claim 8, wherein the processor is further arranged to execute the stored processor-executable instructions to perform:

when the comprehensive charging server detects that the data plan subscribed at the terminal expires, sending a V-SIM card information release request message to the V-SIM card server; and after the V-SIM card server recovers the V-SIM card information, disconnecting the established foreign network connection.

12. The terminal according to claim 8, wherein the processor is further arranged to execute the stored processor-executable instructions to perform:

when receiving a message requesting disconnection of a foreign network connection, sending a V-SIM card information release request message to the V-SIM card server; and after the V-SIM card server recovers the V-SIM card information, disconnecting the established foreign network connection.

13. A charging system, comprising:

a Virtual-Subscriber Identity Module (V-SIM) card server arranged to receive a request sent by a terminal to acquire V-SIM card information about a foreign place, wherein the terminal roams from a local place to the foreign place, wherein the V-SIM card server is further arranged to send the V-SIM card information about the foreign place to the terminal, so that the terminal establishes, after disconnecting a local connection, a foreign network connection using the V-SIM card information and transmits service data;

the charging system further comprising: an authentication server and a comprehensive charging server, wherein the V-SIM card server is further arranged to: after receiving the request sent by the terminal to acquire the V-SIM card information about the foreign place, send a terminal identity validity determination message to the authentication server;

the authentication server is further arranged to: determine whether the identity of the terminal is valid; and, after authenticating the validity of the identity of the terminal and determining that it is valid, send a terminal identity validity response message to the V-SIM card server;

the V-SIM card server is further arranged to: after receiving the terminal identity validity response message, send a terminal fee query message to the comprehensive charging server;

the comprehensive charging server is further arranged to return fee information about the terminal to the V-SIM card server; and the V-SIM card server is further arranged to: determine whether a user of the terminal has credit in his/her account according to the fee information returned by the comprehensive charging server; and, when the user of the terminal has credit in his/her account, search for the V-SIM card information about the foreign place.

14. A non-transitory computer storage medium having stored therein computer executable instructions arranged to execute the following operations:

when it is detected that a terminal roams from a local place to a foreign place, requesting and acquiring Virtual-Subscriber Identity Module (V-SIM) card information about the foreign place from a V-SIM card server;

disconnecting a network connection that has been established using a Subscriber Identity Module (SIM) card, and establishing a network connection using the acquired V-SIM card information; and transmitting service data using the established network connection;

wherein when service data are transmitted using the established network connection, gathering statistics on Internet traffic;

periodically reporting the statistically gathered Internet traffic to a comprehensive charging server;

when the comprehensive charging server calculates according to the reported Internet traffic that a user of the terminal has data traffic to use and a V-SIM card has no data traffic to use, receiving a release message sent by the comprehensive charging server and releasing the acquired V-SIM card information; establishing a foreign network connection using reacquired V-SIM card information; and when the comprehensive charging server calculates according to the reported Internet traffic that the user of the terminal has no data traffic to use, receiving a release message sent by the comprehensive charging server and releasing the acquired V-SIM card information; after the comprehensive charging server recovers the V-SIM card information, disconnecting the established foreign network connection.

* * * * *